(12) United States Patent
Kim et al.

(10) Patent No.: US 12,366,456 B2
(45) Date of Patent: Jul. 22, 2025

(54) USER INTERFACE FOR DISPLAYING POINT OF INTEREST OF MOBILE DEVICE

(71) Applicants: Hyundai Motor Company, Seoul (KR); Kia Corporation, Seoul (KR)

(72) Inventors: Soobin Kim, Seoul (KR); Jae Yul Woo, Seoul (KR); Seunghyun Woo, Seoul (KR); Rowoon An, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 288 days.

(21) Appl. No.: 17/746,607

(22) Filed: May 17, 2022

(65) Prior Publication Data

US 2023/0086016 A1 Mar. 23, 2023

(30) Foreign Application Priority Data

Sep. 17, 2021 (KR) .................. 10-2021-0124984

(51) Int. Cl.
*G01C 21/00* (2006.01)
*G01C 21/36* (2006.01)

(52) U.S. Cl.
CPC ...... *G01C 21/3611* (2013.01); *G01C 21/3614* (2013.01); *G01C 21/3679* (2013.01)

(58) Field of Classification Search
CPC ............ G01C 21/3611; G01C 21/3614; G01C 21/3679; G01C 21/3697; G01C 21/3682; G01C 21/3632
See application file for complete search history.

(56) References Cited

U.S. PATENT DOCUMENTS 9,098,929 B1 * 8/2015 Wakim .................. G06T 17/05
10,817,928 B2 10/2020 Perks et al.
2005/0159974 A1 * 7/2005 Moss ...................... G06Q 30/00
  705/26.1
2009/0024315 A1 * 1/2009 Scheibe ............... G08G 1/0969
  701/532
2009/0156234 A1 6/2009 Sako et al.
(Continued)

FOREIGN PATENT DOCUMENTS

JP 5456383 B2 3/2014
JP 2014153229 A * 8/2014
(Continued)

OTHER PUBLICATIONS

Machine Translation of JP2014153229A (Year: 2014).*
M. Tatzgern, V. Orso, D. Kalkofen, G. Jacucci, L. Gamberini and D. Schmalstieg, "Adaptive information density for augmented reality displays," 2016 IEEE Virtual Reality (VR), Greenville, SC, USA, 2016, pp. 83-92, doi: 10.1109/VR.2016.7504691. (Year: 2016).*
(Continued)

*Primary Examiner* — Anne Marie Antonucci
*Assistant Examiner* — Jordan T Smith
(74) *Attorney, Agent, or Firm* — Slater Matsil, LLP

(57) ABSTRACT

An embodiment mobile device includes a display and a control device configured to control the display to display a user interface on the display, wherein the user interface includes a user menu region configured to allow a user to input a search condition of a point of interest (POI), a detailed information region configured to display information on one or more candidate POIs that satisfy the search condition, and a heat map display region configured to display a distribution of the one or more candidate POIs that satisfy the search condition as a heat map, wherein the heat map is a background for the user menu region and the detailed information region.

20 Claims, 10 Drawing Sheets

(56) References Cited

U.S. PATENT DOCUMENTS

| | | | | |
|---|---|---|---|---|
| 2011/0161875 A1* | 6/2011 | Kankainen | ............ | G06F 3/0481 |
| | | | | 715/810 |
| 2012/0221595 A1* | 8/2012 | Slowe | ................ | G06Q 30/0283 |
| | | | | 707/769 |
| 2015/0262428 A1* | 9/2015 | Tatzgern | ................ | G06F 3/017 |
| | | | | 345/633 |
| 2016/0012066 A1* | 1/2016 | Ning | ................ | G01C 21/3476 |
| | | | | 707/722 |
| 2018/0106638 A1* | 4/2018 | Nallu | ................ | G01C 21/3679 |
| 2018/0164105 A1* | 6/2018 | Park | ...................... | G01C 21/362 |
| 2018/0322174 A1* | 11/2018 | Vasilyev | ............ | G01C 21/3673 |
| 2020/0264007 A1* | 8/2020 | Yoo | ........................... | G06T 7/74 |
| 2022/0292543 A1* | 9/2022 | Henderson | ......... | G06Q 30/0252 |
| 2024/0062432 A1* | 2/2024 | Lee | ....................... | G06T 19/006 |

FOREIGN PATENT DOCUMENTS

| | | | | |
|---|---|---|---|---|
| JP | 2020155049 A | | 9/2020 | |
| KR | 20020057530 A | | 7/2002 | |
| KR | 20140018635 A | | 2/2014 | |
| WO | WO-2010040400 A1 * | | 4/2010 | ......... G01C 21/3614 |

OTHER PUBLICATIONS

J. Lee, K.-S. Kim, H. Ogawa and Y. Kwon, "MixedWalk: Explore Ahead before Stepping in Mobile Augmented Reality Services," 2017 IEEE International Conference on AI & Mobile Servies (AIMS), Honolulu, HI, USA, 2017, pp. 62-69, doi: 10.1109/AIMS. 2017.17. (Year: 2017).*

* cited by examiner

FIG. 7
720
740
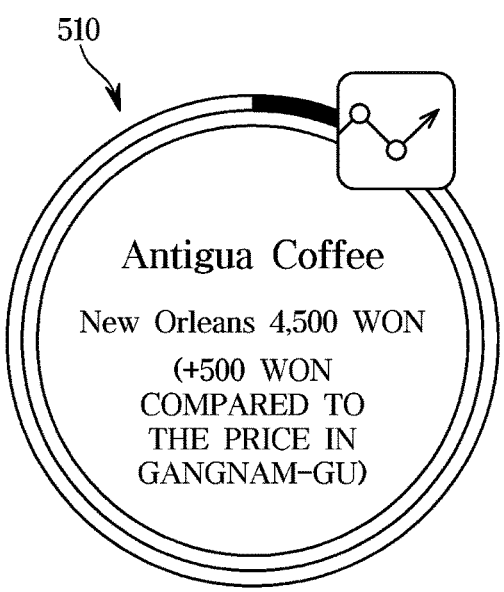
760
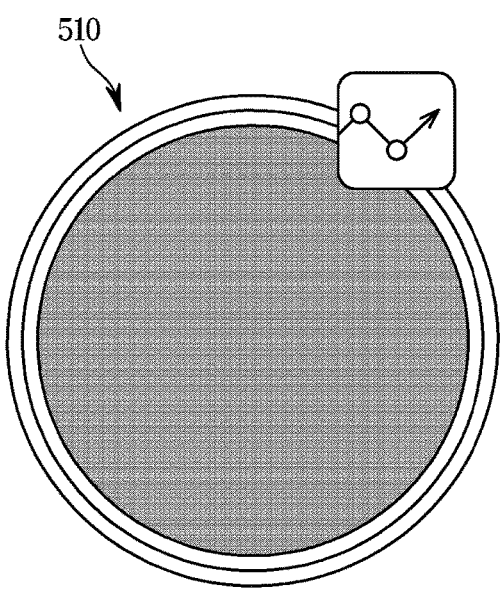
780

FIG. 9
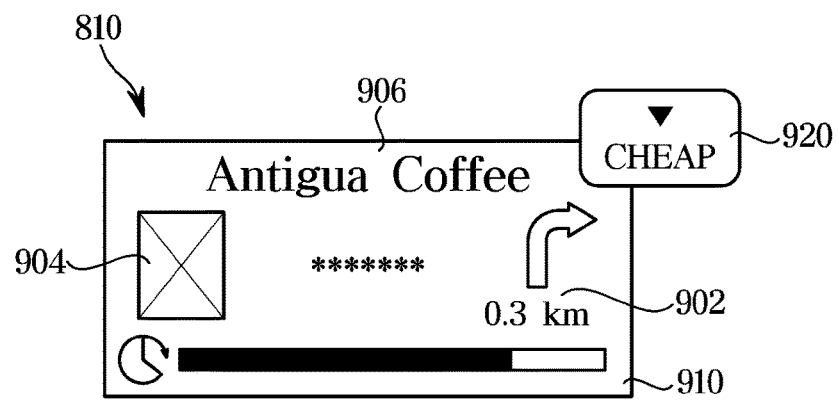
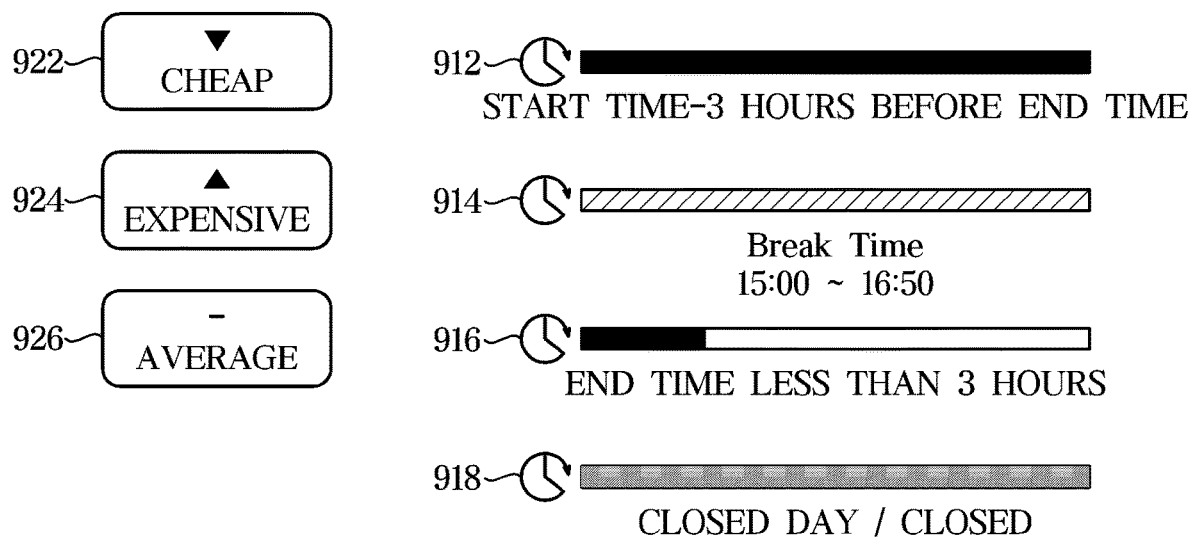

USER INTERFACE FOR DISPLAYING POINT OF INTEREST OF MOBILE DEVICE

CROSS-REFERENCE TO RELATED APPLICATIONS

This application claims the benefit of Korean Patent Application No. 10-2021-0124984, filed on Sep. 17, 2021, which application is hereby incorporated herein by reference.

TECHNICAL FIELD

The disclosure relates to guidance of a point of interest.

BACKGROUND

Augmented reality (AR) is a technology that shows a single image by superimposing a two-dimensional or three-dimensional virtual world image on an image of the real world. Augmented reality, a concept that complements the real world with a virtual world, uses a virtual environment created with computer graphics, but the main character is the real environment. Computer graphics serve to provide additional information necessary for the real environment. The computer graphic makes the distinction between the real environment and a virtual screen ambiguous by overlapping a 3D virtual image on an actual image that a user is viewing. Augmented reality technology, in which the real environment and virtual objects are mixed, allows the user to see the real environment, thereby providing better realism and additional information. For example, when the surroundings are photographed with a camera provided in a mobile device (e.g., a cell phone), information such as the location of a building or structure in an image captured by a camera and a registered phone number are displayed together in the image.

SUMMARY

The disclosure relates to guidance of a point of interest. Particular embodiments relate to guidance of a pre-registered point of interest through a mobile device.

An embodiment of the disclosure provides a varied and effective user interface for displaying a point of interest (POI) on a display of a mobile device.

Additional embodiments of the disclosure will be set forth in part in the description which follows and, in part, will be obvious from the description, or may be learned by practice of the disclosure.

In accordance with an embodiment of the disclosure, a mobile device includes a display and a control device configured to control the display such that a user interface for displaying a point of interest (POI) is displayed on the display, wherein the user interface includes a user menu region provided to allow a user to input a search condition of a POI, a detailed information region provided to display information on a POI satisfying the search condition, and a heat map display region provided to display a distribution of POIs satisfying the search condition in the form of a heat map as a background of the user menu region and the detailed information region.

In the user interface described above, the detailed information region is provided to display price information of a product sold in a store corresponding to the POI.

In the user interface described above, the price information includes at least one of a national average price and an area average price of the product.

In the user interface described above, the detailed information region further includes an additional user menu provided to select a unique search condition of a category to which the POI belongs.

In the user interface described above, the additional user menu displays a plurality of search conditions in a drop-down manner.

In accordance with an embodiment of the disclosure, a mobile device includes a display and a control device configured to control the display such that a user interface for displaying a point of interest (POI) is displayed on the display, wherein the user interface includes a user menu region provided to allow a user to input a search condition of a POI, a detailed information region provided to display price information of a product sold in a store corresponding to the POI satisfying the search condition, a national average price and an area average price, and provided to select a unique search condition of a category to which the POI belongs through a drop-down manner in an additional user menu, and a heat map display region provided to display a distribution of POIs satisfying the search condition in the form of a heat map as a background of the user menu region and the detailed information region.

In the user interface described above, the additional user menu displays a plurality of search conditions in the drop-down manner.

In accordance with an embodiment of the disclosure, a mobile device includes a display and a control device configured to control the display such that a user interface for displaying a point of interest (POI) is displayed on the display, wherein the user interface includes a POI tag provided to display information of the POI around a current location, and the POI tag is provided to display a business status of the POI through at least one of a color and a length.

In the user interface described above, the business status of the POI includes indicating whether the POI is currently open.

In the user interface described above, the business status of the POI includes indicating remaining opening hours of the POI.

In the user interface described above, the business status of the POI includes indicating whether the POI is currently a break time.

In the user interface described above, the business status of the POI includes indicating whether the POI is currently closed or a closed day.

In the user interface described above, the business status of the POI is displayed in a ring shape.

In the user interface described above, the business status of the POI is displayed in a bar shape.

In accordance with an embodiment of the disclosure, a mobile device includes a display and a control device configured to control the display such that a user interface for displaying a point of interest (POI) is displayed on the display, wherein the user interface includes a POI tag provided to display information of the POI around a current location, and the POI tag is provided to display business states of the POI by expressing at least one of a ring shape and a bar shape as different colors or different lengths.

In the user interface described above, the business status of the POI includes indicating whether the POI is currently open.

In the user interface described above, the business status of the POI includes indicating remaining opening hours of the POI.

In the user interface described above, the business status of the POI includes indicating whether the POI is currently a break time.

In the user interface described above, the business status of the POI includes indicating whether the POI is currently closed or a closed day.

BRIEF DESCRIPTION OF THE DRAWINGS

These and/or other embodiments of the disclosure will become apparent and more readily appreciated from the following description of exemplary embodiments, taken in conjunction with the accompanying drawings, in which:

FIG. 7 is a diagram illustrating a display of a business status in the POI tag illustrated in FIG. 6;

FIG. 9 is a diagram illustrating a configuration of an augmented reality-based POT tag according to an embodiment of the disclosure illustrated in FIG. 8.

DETAILED DESCRIPTION OF ILLUSTRATIVE EMBODIMENTS

Figure 1:
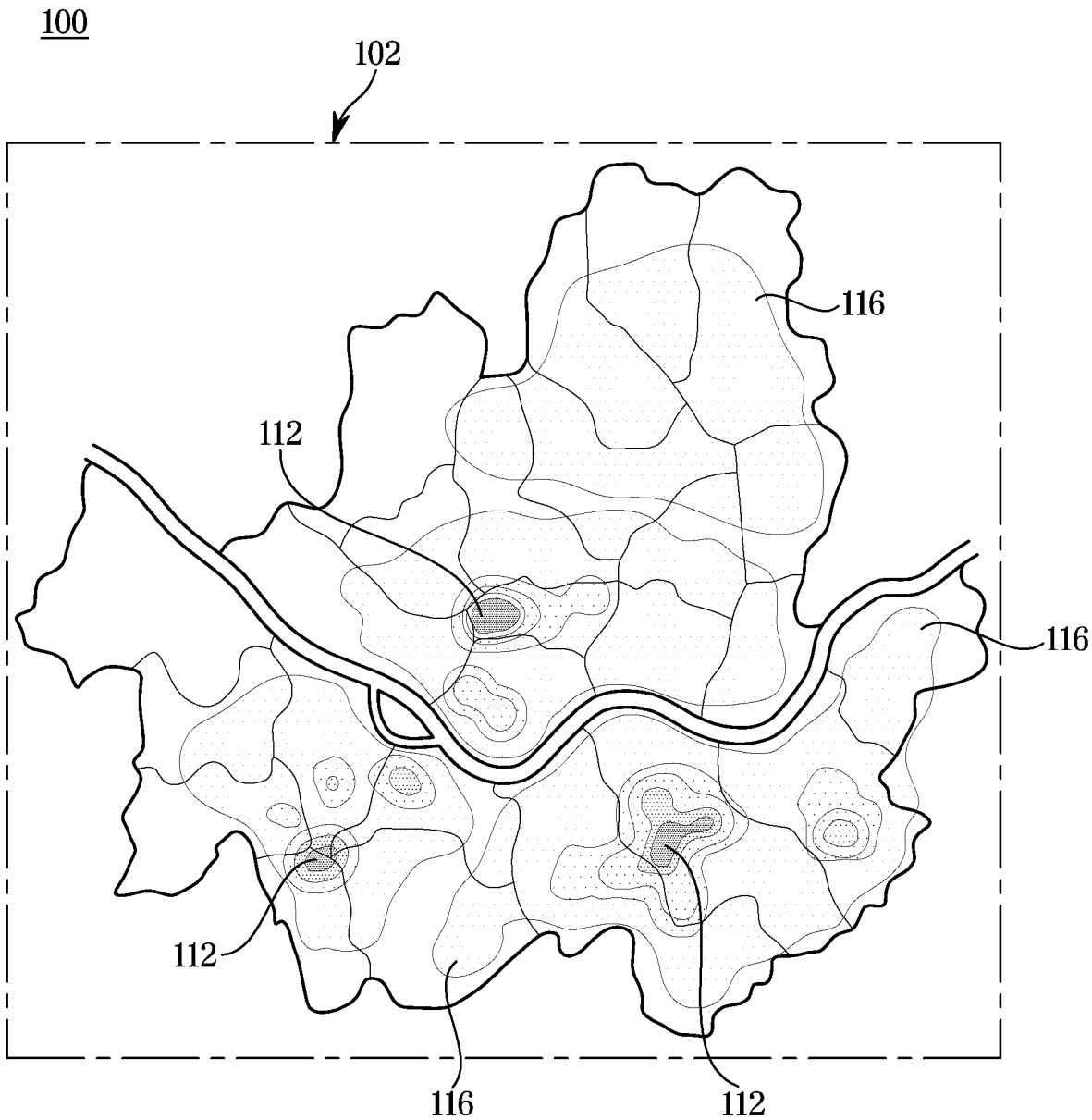
FIG. 1 is a diagram illustrating an embodiment of displaying a point of interest on a mobile device according to an embodiment of the disclosure.

FIG. 1 is a diagram illustrating an embodiment of displaying a point of interest on a mobile device according to an embodiment of the disclosure.

As illustrated in FIG. 1, a mobile device 100 according to an embodiment of the disclosure may display a point of interest (POI) in the form of a heat map on a display 102. The display of the POI in the form of a heat map illustrated in FIG. 1 may be implemented based on a dynamic database.

The heat map displayed on the mobile device 100 according to an embodiment of the disclosure is a data visualization technique for displaying data for each category of a point of interest in a specific area in two-dimensional color. In the heat map, a change in color may be expressed through color classification or a change in shade. The heat map provides information on clusters or distributions of data for each POI category through a two-dimensional color change.

In FIG. 1, dark colored portions 112 are points in which specific data values of points of interest in a corresponding category are relatively large. Conversely, light colored portions 116 are points in which specific data values of points of interest in a corresponding category are relatively small.

In the mobile device according to an embodiment of the disclosure, through the display of the point of interest in the form of a heat map as illustrated in FIG. 1, information related to 'price', 'opening hours', 'closed days', and 'market price for each product' may be provided for each POI category in a specific area. In addition, information related to 'average price', 'average opening hours', and 'comparison of prices for each product by area' may be provided for each POI category in a specific area.

Figure 2:
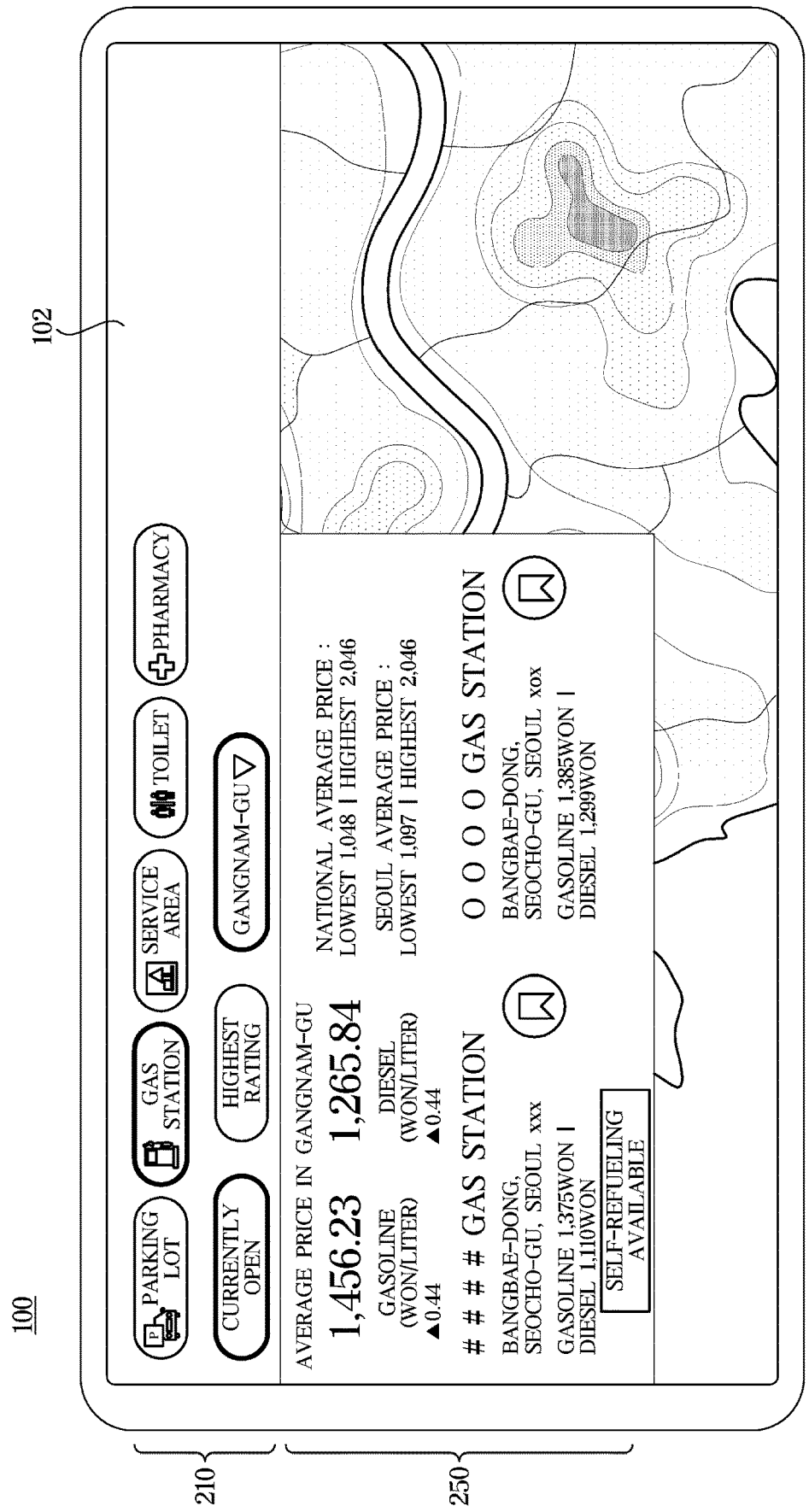
FIG. 2 is a diagram illustrating a user interface of the mobile device illustrated in FIG. 1.

FIG. 2 is a diagram illustrating a user interface of the mobile device illustrated in FIG. 1.

As illustrated in FIG. 2, in a state in which a distribution of points of interest (POIs) is displayed in the background in the form of a heat map on the display 102, a user menu region 210 and a detailed information region 250 may be displayed together. A user may designate a search condition (e.g., a category) of a desired POI through selection of several user menus displayed in the user menu region 210. Selection of a menu may be carried out by touching a tab of the corresponding menu. The result of selection of the user menu displayed in the user menu region 210 is displayed in detail in the detailed information region 250.

Various user menus displayed in the user menu region 210 may include menus for selecting a POI category such as 'parking lot', 'gas station', 'service area', 'toilet', and 'pharmacy'. In addition, the various user menus displayed in the user menu region 210 may include, for example, menus from which 'currently open', 'highest rating', and 'area' may be selected. The 'currently open' is for selecting points of interest that are currently open. The ' highest rating' is for selecting points of interest having the highest rating given by the user. The 'area' is for searching for a point of interest by targeting a specific area.

In FIG. 2, for example, 'gas station', 'currently open', and 'Gangnam-gu' are selected. As a result of this selection, information on 'currently open gas stations in Gangnam-gu' is displayed in the detailed information region 250. That is, in the detailed information region 250 in this case, 'average price (won/liter) of gasoline in Gangnam-gu', 'national average price', 'average price in Seoul', and a list of gas stations that satisfy a set condition and related information (name, address, and price) may be displayed.

Figure 3:
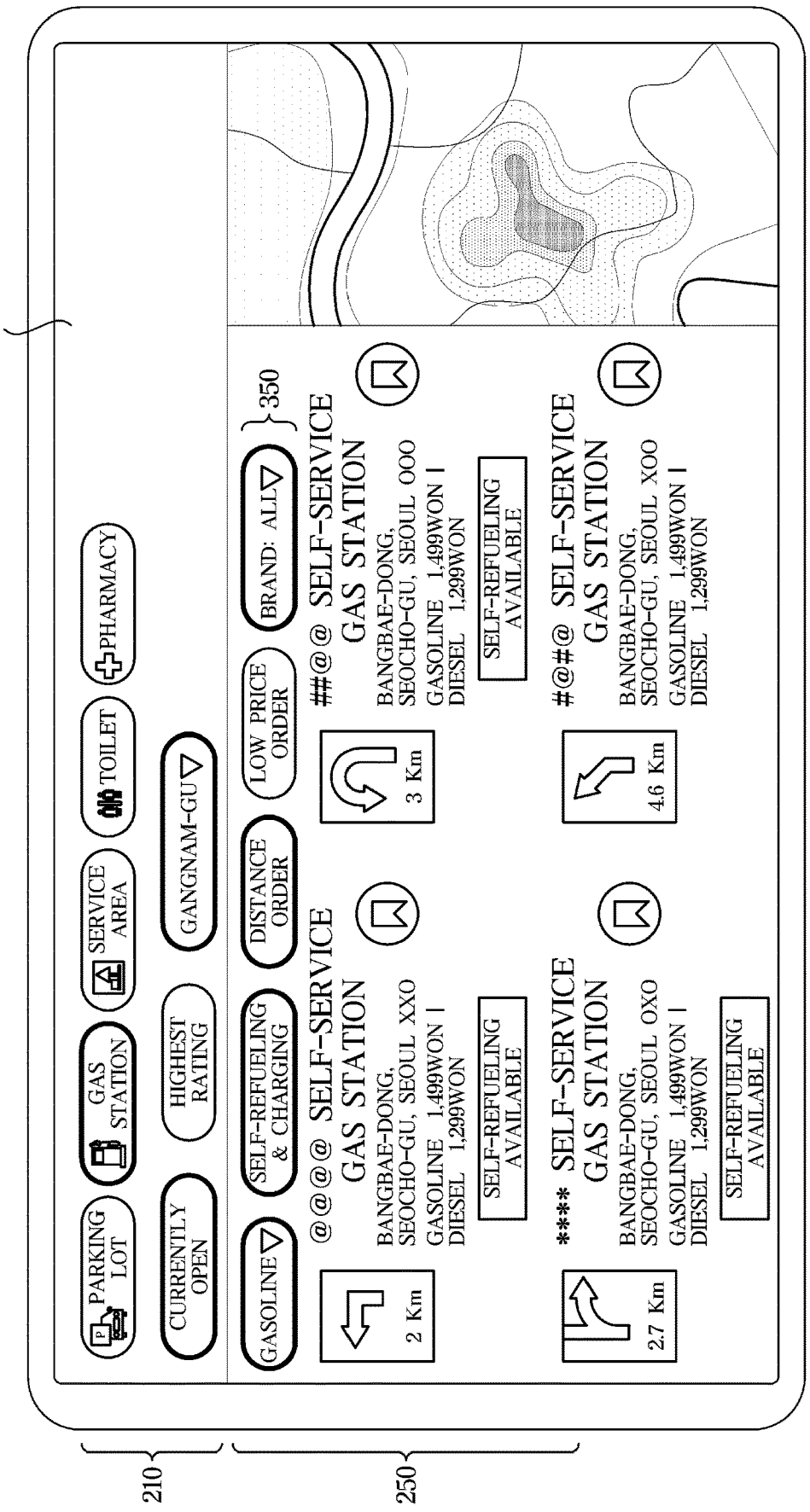
FIG. 3 is a diagram illustrating another user interface of the mobile device illustrated in FIG. 1.

FIG. 3 is a diagram illustrating another user interface of the mobile device illustrated in FIG. 1. A user interface illustrated in FIG. 3 further includes an additional user menu 350 displayed in the detailed information region 250.

As illustrated in FIG. 3, as an additional user menu 350 in the detailed information region 250, tabs for setting 'type of fuel', 'self-fueling or not', 'sort order', and 'brand' are displayed. The 'type of fuel' is provided to select the type of fuel to be refueled, such as gasoline and diesel. The 'self-refueling or not' is provided to select a self-refueling gas station or a gas station that provides a refueling service. By selecting a 'self-refueling' tab, not only general gas stations but also gas stations that provide electricity/hydrogen charging services may be searched. In the case of the gas stations that provide the charging services, information related to the number of chargers and waiting/charge status of each charger may also be identified.

The 'sort order' allows search results to be sorted based on distance or price. The 'brand' is provided to select a gas station that sells a product of a specific brand by selecting a brand of a specific oil company.

In such additional menus, selectable items are displayed in a drop-down manner, which will be described in detail later with reference to FIG. 4.

Figure 4:
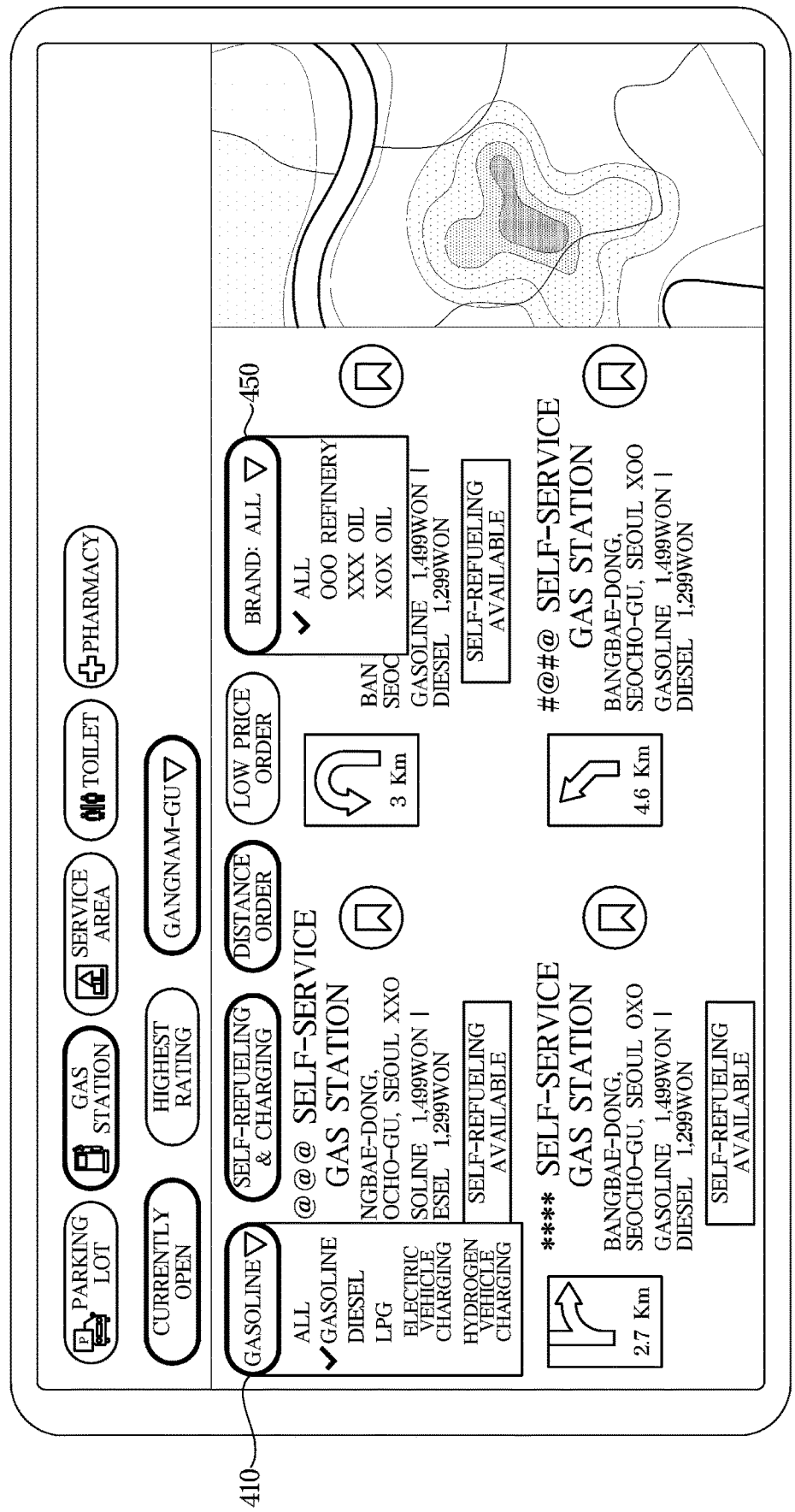
FIG. 4 is a diagram illustrating a display mode of an additional user menu of the user interface illustrated in FIG. 3.

FIG. 4 is a diagram illustrating a display mode of an additional user menu of the user interface illustrated in FIG. 3.

As illustrated in FIG. 4, when the user touches a 'type of fuel' menu 410, a plurality of fuel names is displayed in the drop-down manner. The user may select (touch) a desired fuel type from among a plurality of displayed fuel types. In addition, when the user touches a 'brand selection' menu 450, the brand names of a plurality of oil companies is displayed in the drop-down manner. The user may select (touch) a desired brand from among the displayed brand names of oil companies.

Figure 5:
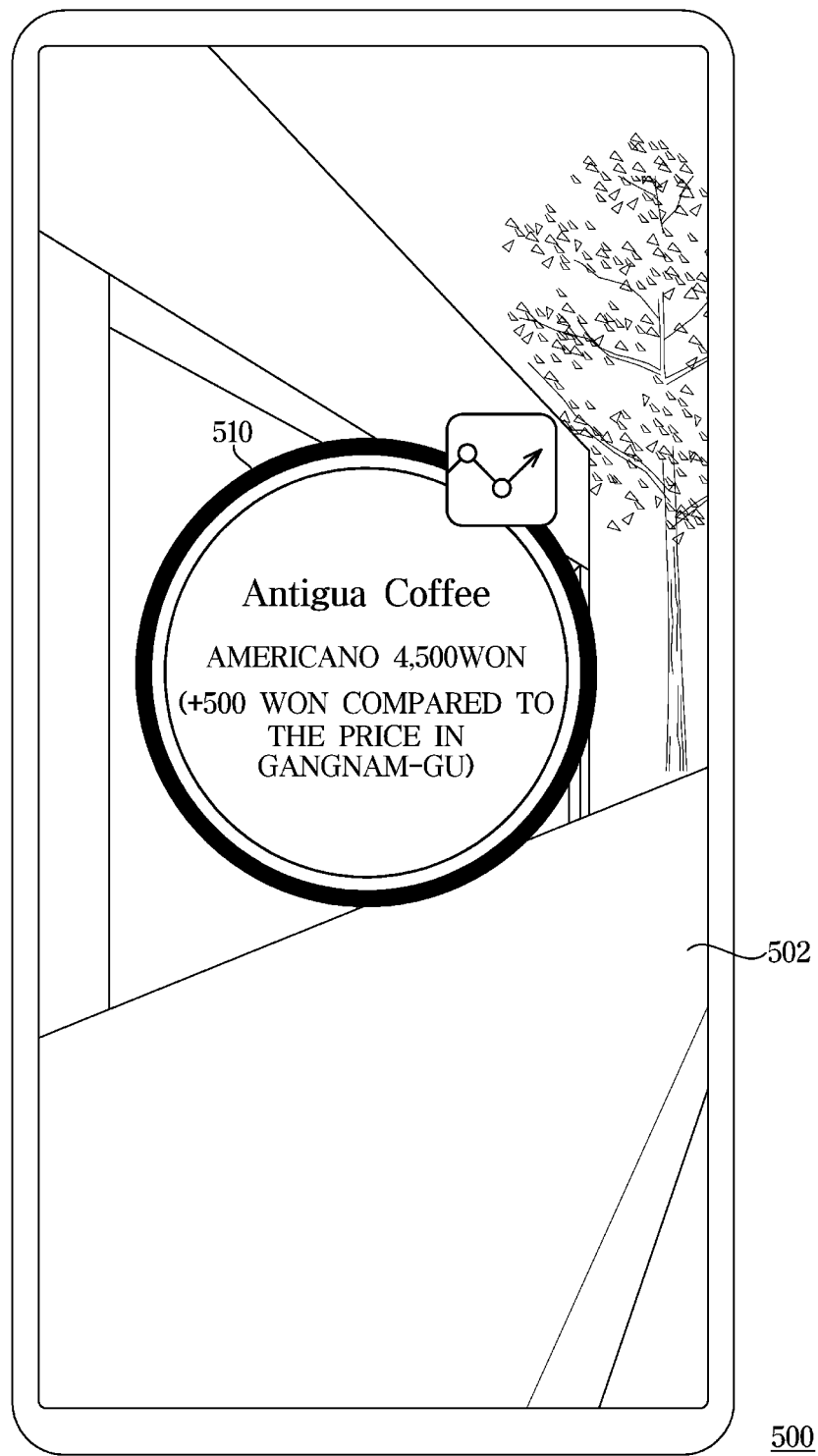
FIG. 5 is a diagram illustrating another embodiment of displaying a point of interest on the mobile device according to an embodiment of the disclosure.

FIG. 5 is a diagram illustrating another embodiment of displaying a point of interest on the mobile device according to an embodiment of the disclosure. The display of a POI on a mobile device 500 illustrated in FIG. 5 is provided based on augmented reality. To this end, the mobile device 500 may be equipped with a camera (see reference numeral 1034 of FIG. 10) and an augmented reality module (see reference numeral 1040 of FIG. 10).

As illustrated in FIG. 5, an image photographed through the camera of the mobile device 500 is displayed through a display 502, and a previously registered POI tag (or POI widget) 510 is displayed on the image based on an augmented reality technology. The augmented reality-based POI tag 510 according to an embodiment of the disclosure displays a variety of information related to the corresponding POI, which will be described in detail later with reference to FIG. 6.

Figure 6:
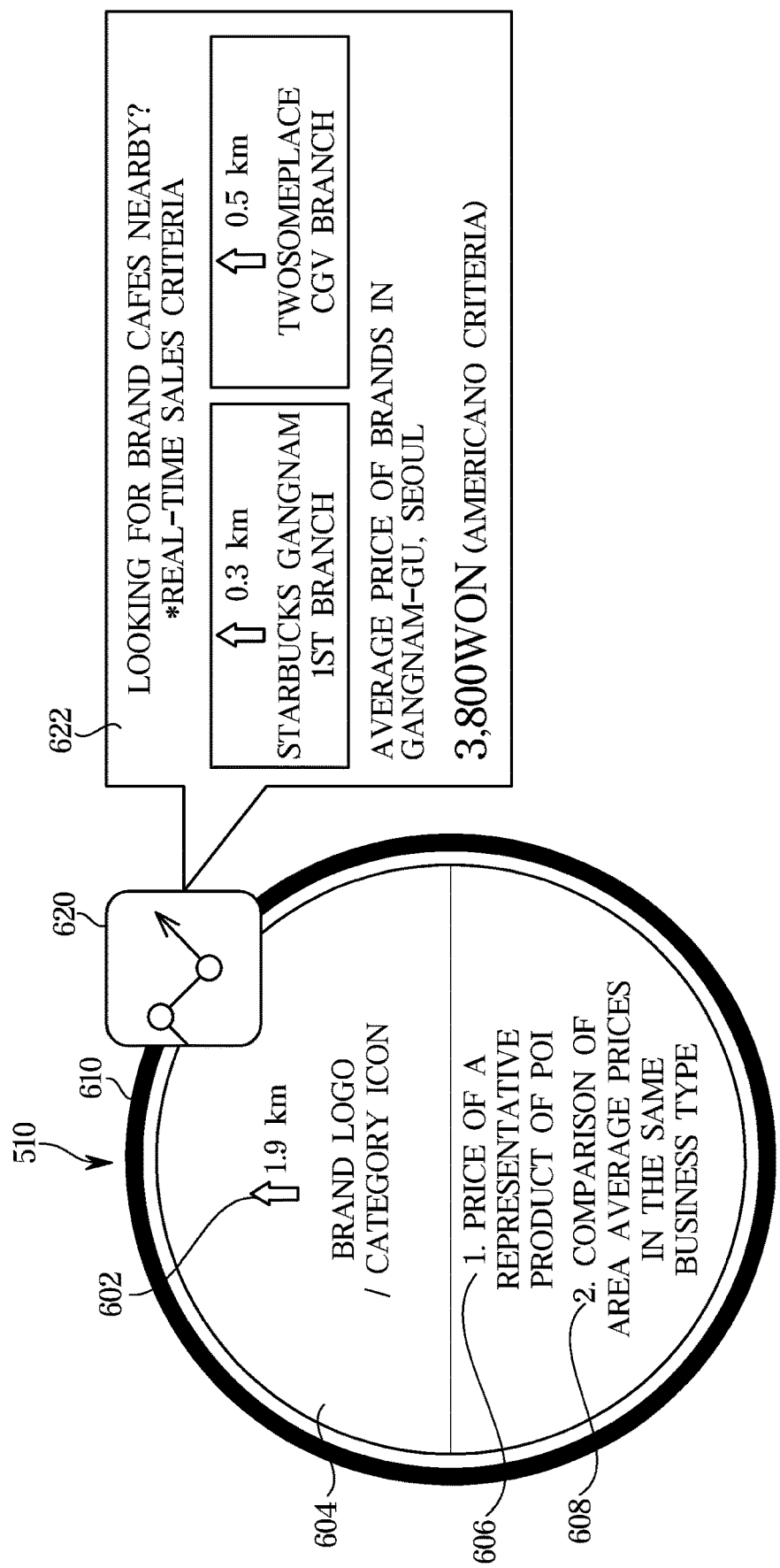
FIG. 6 is a diagram illustrating a configuration of an augmented reality-based POI tag according to an embodiment of the disclosure illustrated in FIG. 5.

FIG. 6 is a diagram illustrating a configuration of an augmented reality-based POI tag according to an embodiment of the disclosure illustrated in FIG. 5.

As illustrated in FIG. 6, the augmented reality-based POI tag 510 according to an embodiment of the disclosure displays a variety of information related to the POI as follows.

First, in the POI tag 510, a distance and direction from a current location of the mobile device 500 to the corresponding POI may be displayed (reference numeral 602). In the case of FIG. 6, the corresponding POI is displayed as being located at a distance of 1.9 km away from the front.

Also, in the POI tag 510, a category or brand (logo or trademark) of the POI may be displayed (reference numeral 604). When the category of the corresponding POI is a cafe, an icon symbolizing the cafe may be displayed. Or, when the corresponding POI is a registered brand, a logo or trademark symbolizing the corresponding brand may be displayed. When the brand is an unregistered POI, only an icon of the category may be displayed. When the brand is a registered POI, the category and the brand may be selectively displayed depending on a distance between the mobile device 500 and the corresponding POI. That is, for example, when the distance between the mobile device 500 and the corresponding POI is greater than or equal to a preset distance (e.g., 50 meters), the category of the corresponding POI may be displayed. When the distance between the mobile device 500 and the corresponding POI approaches less than the preset distance (e.g., 50 meters), the brand of the corresponding POI may be displayed.

Also, in the POI tag 510, a name and price of a representative product of the corresponding POI may be displayed (reference numeral 606). For example, when the corresponding POI is a cafe, the representative menu 'Americano' and its price (4,500 won) may be displayed.

Also, in the POI tag 510, a price comparison result of the same business type of the corresponding category may be displayed (reference numeral 608). For example, the price comparison result may be a result of comparing the product price of the corresponding POI with an area average price of the same business type.

Also, in the POI tag 510, a business state of the corresponding POI may be displayed (reference numeral 610). In FIG. 6, the business state of the corresponding POI may be displayed through an aspect of a ring 610 forming a circumference of the POI tag 510. The display of the business state in the POI tag 510 as described above will be described in detail later with reference to FIG. 7.

Also, in the POI tag 510, a badge for providing more detailed information related to a currently selected POI category may be displayed (reference numeral 620). When the user taps (touches) the badge 620, a detailed information pop-up 622 is displayed. Or, when the user taps (touches) the badge 620, information on recommended POIs of the currently selected category may be displayed.

In the detailed information pop-up 622, a list of a certain number of points of interest that are currently open among the points of interest in the currently selected category is displayed. Also, an average price of a representative menu of points of interest in the same category around a current location may be displayed. For example, in the detailed information pop-up 622 of FIG. 6, when the currently selected category is a cafe and the current location is Gangnam-gu, it is displayed that the average price of 'Americano (representative menu)' at a cafe located in Gangnam-gu is 3,800 won.

In an embodiment of the disclosure, when the POI is relatively closer to a current location of the user, the POI tag 510 may be displayed relatively larger, and conversely, when the POI is relatively farther from the current location of the user, the POI tag 510 may be displayed relatively smaller.

FIG. 7 is a diagram illustrating a display of a business status in the POI tag illustrated in FIG. 6.

In the description of FIG. 6 above, it has been described that the business status of the corresponding POI may be displayed through an aspect of the ring 610 forming the circumference of the POI tag 510 according to an embodiment of the disclosure.

As illustrated in FIG. 7, in an embodiment of the disclosure, when the corresponding POI is open, the entire ring 610 forming the circumference of the POI tag 510 may be displayed in a solid line of a specific color (reference numeral 720). For example, the corresponding POI may be displayed in green from the start of business until 2 hours before the end of business to indicate that the POI is currently open. Even when the corresponding POI is a store that is open 24 hours, it may be displayed as reference numeral 720 of FIG. 7.

Also, in an embodiment of the disclosure, when the corresponding POI is open, but it is currently a break time, only a partial section of the ring 610 forming the circumference of the POI tag 510 may be limitedly displayed in a solid line of a specific color (reference numeral 740). For example, when the corresponding POI is currently in the break time, the ring 610 may be displayed in yellow to indicate that it is currently the break time.

Also, in an embodiment of the disclosure, when remaining business hours of the corresponding POI are less than a predetermined time until a business end time, only a partially short section of the ring 610 forming the circumference of the POI tag 510 may be displayed in a solid line of a specific color (reference numeral 760). For example, when the remaining business hours of the corresponding POI are less than 2 hours until the business end time, only a section of 20% of the ring 610 may be displayed in red to indicate that the business end is imminent.

Also, in an embodiment of the disclosure, when the corresponding POI is not open, the ring 610 forming the circumference of the POI tag 510 may be displayed in a preset solid color (reference numeral 780). For example, when the corresponding POI is closed because it is a closed day, or when the corresponding POI is no longer open because the business on that day has already ended, by displaying and inactivating the entire POI tag 510 (including the ring 610 of the circumference thereof) in a solid color such as white, black or gray, the corresponding POI may be displayed as being currently closed.

Figure 8:
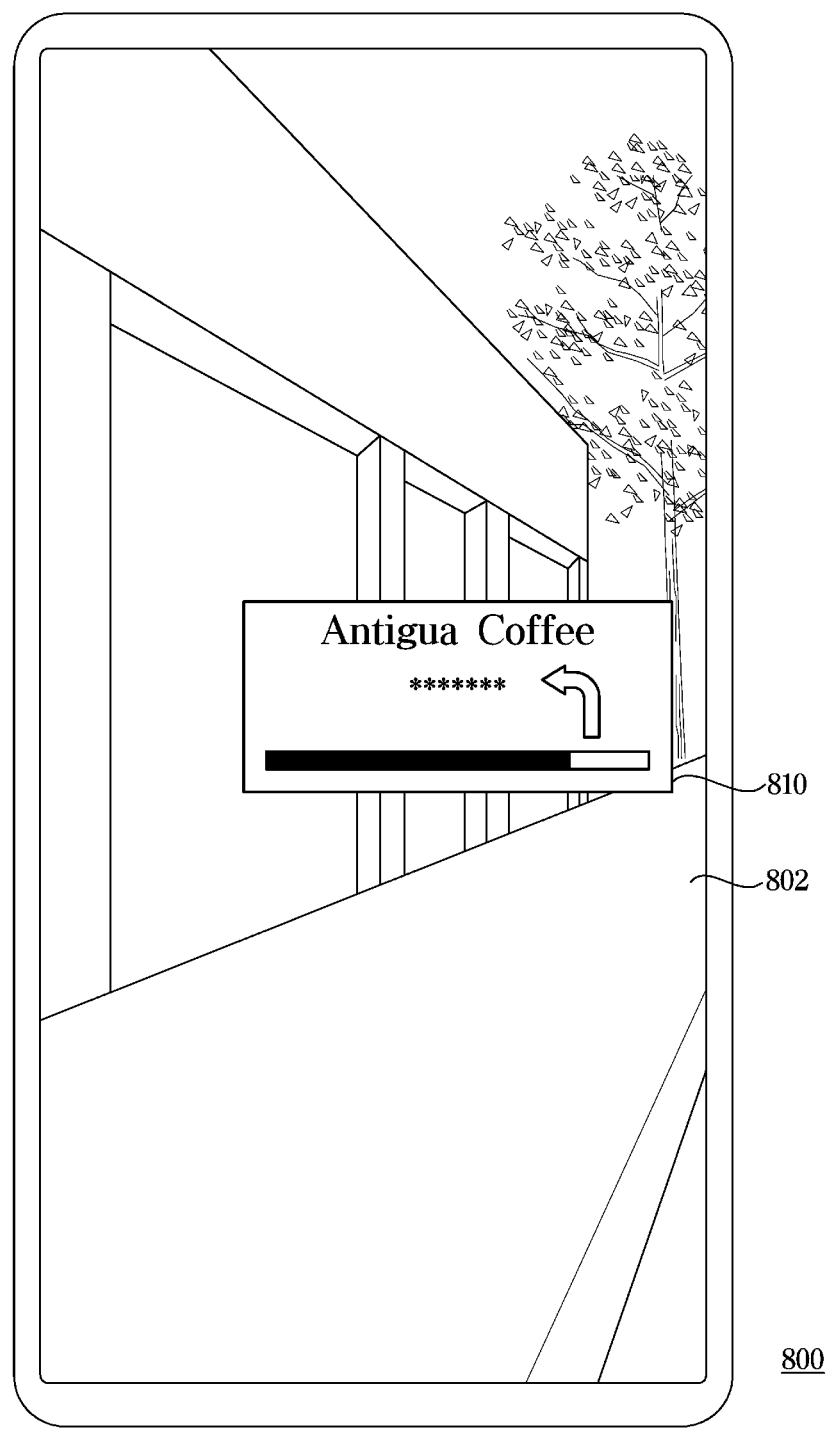
FIG. 8 is a diagram illustrating another embodiment of displaying a point of interest on the mobile device according to an embodiment of the disclosure.

FIG. 8 is a diagram illustrating another embodiment of displaying a point of interest on the mobile device according to an embodiment of the disclosure. The display of a POI on a mobile device 800 illustrated in FIG. 8 is provided based on augmented reality. To this end, the mobile device 800 may be equipped with a camera (see reference numeral 1034 of FIG. 10) and an augmented reality module (see reference numeral 1040 of FIG. 4).

As illustrated in FIG. 8, an image photographed through the camera of the mobile device Boo is displayed through a display 802, and a previously registered POI tag (or POI widget) 810 is displayed on the image based on the augmented reality technology. The augmented reality-based POI tag 810 according to an embodiment of the disclosure displays a variety of information related to the corresponding POI, which will be described in detail later with reference to FIG. 9.

FIG. 9 is a diagram illustrating a configuration of an augmented reality-based POI tag according to an embodiment of the disclosure illustrated in FIG. 8.

As illustrated in FIG. 9, the augmented reality-based POI tag 810 according to an embodiment of the disclosure displays a variety of information related to the POI as follows.

First, in the POI tag 81*o*, a distance and direction from a current location of the mobile device 800 to the corresponding POI may be displayed (reference numeral 902). In the case of FIG. 9, the corresponding POI is displayed as being located at a distance of 0.3 km away from a front right.

Also, in the POI tag 810, a category or brand (logo or trademark) of the POI may be displayed (reference numeral 904). When the category of the corresponding POI is a cafe, an icon symbolizing the cafe may be displayed. Or, when the corresponding POI is a registered brand, a logo or trademark symbolizing the corresponding brand may be displayed. When the brand is an unregistered POI, only an icon of the category may be displayed. When the brand is a registered POI, the category and the brand may be selectively displayed depending on a distance between the mobile device 800 and the corresponding POI. That is, for example, when the distance between the mobile device 800 and the corresponding POI is greater than or equal to a preset distance (e.g., 50 meters), the category of the corresponding POI may be displayed. When the distance between the mobile device 800 and the corresponding POI is less than the preset distance (e.g., 50 meters), the brand of the corresponding POI may be displayed.

Also, in the POI tag 810, a name and price of a representative product of the corresponding POI may be displayed (reference numeral 906). For example, when the corresponding POI is a cafe, the representative menu 'Americano' and its price (4,500 won) may be displayed.

Also, in the POI tag 810, a business state of the corresponding POI may be displayed (reference numeral 910). In FIG. 9, the business status of the corresponding POI may be displayed through an aspect of a bar 910 positioned at a lower portion of the POI tag 810.

For example, in an embodiment of the disclosure, when the corresponding POI is open, an entire bar 910 of the POI tag 810 may be displayed in a specific color (reference numeral 912). For example, the corresponding POI may be displayed in green from the start of business until 3 hours before the end of business to indicate that the POI is currently open. Even when the corresponding POI is a store that is open 24 hours, it may be displayed as reference numeral 912 of FIG. 9.

Also, in an embodiment of the disclosure, when the corresponding POI is open, but it is currently a break time, only a partial section of the bar 910 of the POI tag 810 may be limitedly displayed in a specific color (reference numeral 914). For example, when the corresponding POI is currently the break time, the bar 910 may be displayed in yellow to indicate that it is currently the break time.

Also, in an embodiment of the disclosure, when remaining business hours of the corresponding POI are less than a predetermined time until a business end time, only a partially short section of the bar 910 of the POI tag 810 may be displayed in a specific color (reference numeral 916). For example, when the remaining business hours of the corresponding POI are less than 3 hours until the business end time, only a section of 20% of the bar 910 may be displayed in red to indicate that the business end is imminent.

Also, in an embodiment of the disclosure, when the corresponding POI is not open, the bar 910 of the POI tag 810 may be displayed in a preset solid color (reference numeral 918). For example, when the corresponding POI is closed because it is a closed day, or when the corresponding POI is no longer open because the business on that day has already ended, by displaying and inactivating the bar 910 of the POI tag 810 in a solid color such as black or gray, the corresponding POI may be displayed as being currently closed.

Also, in the POI tag 81*o*, a badge for providing additional information related to a currently selected POI category may be displayed (reference numeral 920). In an embodiment of the disclosure, as indicated in reference numerals 922, 924, and 926, a result of comparing a price of the corresponding POI with an average price of the corresponding area may be displayed through the badge 920. For example, when the price of the corresponding POI is higher than the average price of the corresponding area, 'expensive' may be displayed on the badge 920. Also, for example, when the price of the corresponding POI is lower than the average price of the corresponding area, 'cheap' may be displayed on the badge 920. Also, for example, when the price of the corresponding POI is the same as or similar to the average price of the corresponding area, 'average' may be displayed on the badge 920.

In an embodiment of the disclosure, when the POI is relatively closer to a current location of the user, the POI tag 810 may be displayed relatively larger, and conversely, when the POI is relatively farther from the current location of the user, the POI tag 810 may be displayed relatively smaller.

Figure 10:
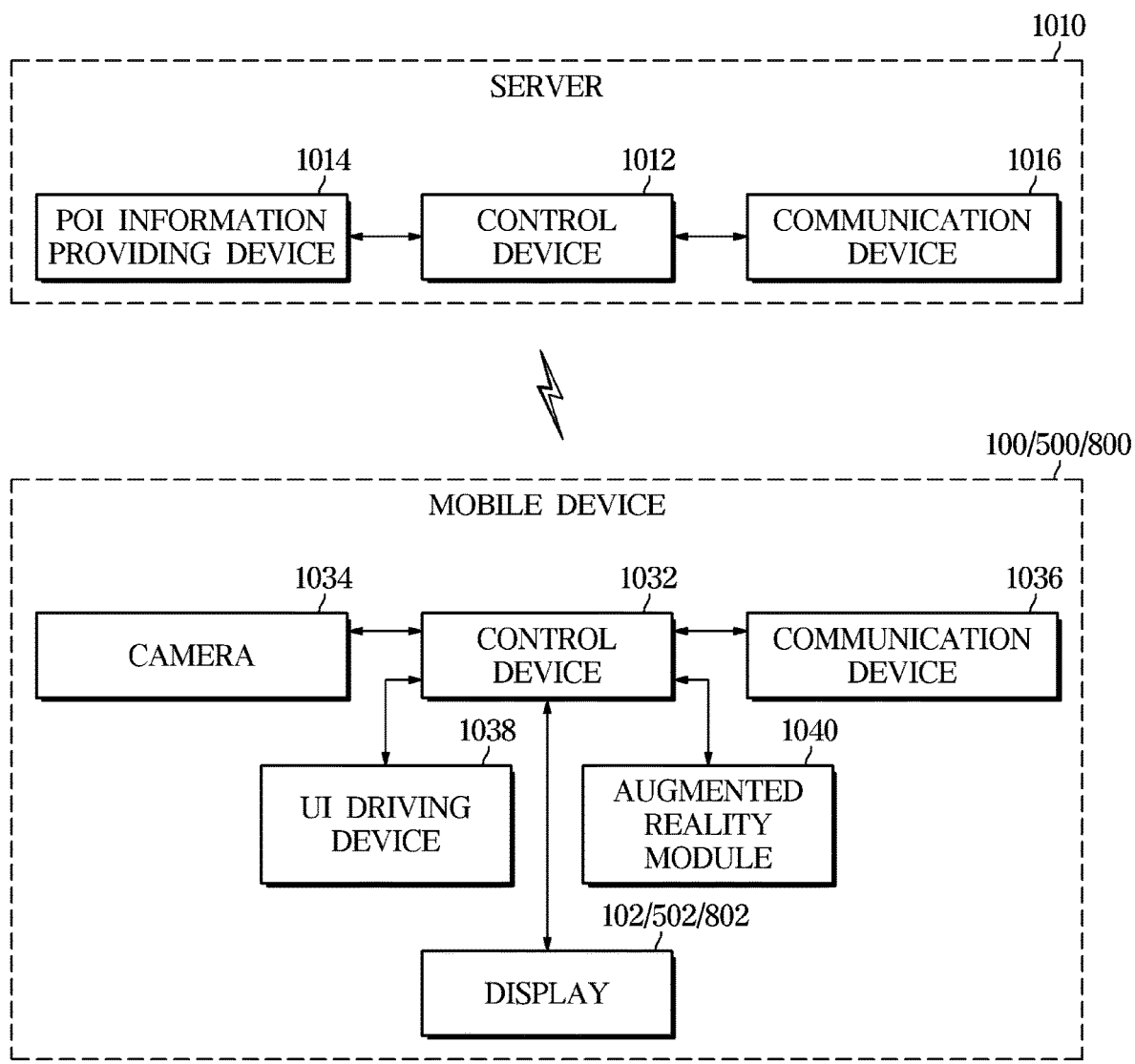
FIG. 10 is a diagram illustrating an example of a device configuration according to an embodiment of the disclosure.

FIG. 10 is a diagram illustrating an example of a device configuration according to an embodiment of the disclosure. The embodiments described above with reference to FIGS. 1 to 9 may be implemented based on the device configuration of FIG. 10.

As illustrated in FIG. 10, the mobile devices 100, 500, and 800 are connected to a remote server 1010 to communicate with each other. The communication between the remote server 1010 and the mobile devices 100, 500, and 800 may be performed using a wireless communication method.

The server 1010 may include a control device 1012, a POI information providing device 1014, and a communication device 1016. The POI information providing device 1014 stores POI information related to a display of a POI widget in the mobile devices 100, 500, and 800. The POI information providing device 1014 provides the POI information to the control device 1012 in response to a request from the control device 1012. The control device 1012 transmits the POI information provided from the POI information providing device 1014 to the mobile devices 100, 500, and 800 through the communication device 1016.

The mobile devices 100, 500, and 800 may include a control device 1032, a camera 1034, a communication device 1036, a user interface driving device 1038, an augmented reality module 1040, and the displays 102, 502, 802. The camera 1034 is provided to allow the user to photograph surrounding POI-related information and input the photographed information to the mobile devices 100, 500, and 800. The user interface driving device 1038 is provided to allow the user to select menus or input data. To this end, the user interface driving device 1038 may display the user interface on the displays 102, 502, and 802. The communication device 1036 is provided to communicate with the server 1010. The control device 1032 may transmit or receive the POI information and augmented reality-related information through communication with the server 1010 through the communication device 1036. The augmented reality module 1040 implements augmented reality related to the POI information under the control of the control device 1032, and the control device 1032 displays an image implemented through the augmented reality module 1040 on the displays 102, 502, and 802.

As is apparent from the above, according to an embodiment of the disclosure, various and effective user interfaces for displaying a point of interest (POI) on a display of a mobile device can be provided.

The embodiments disclosed with reference to the accompanying drawings have been described above. It will be understood by those skilled in the art that various changes in form and details may be made therein without departing from the spirit and scope of the disclosure as defined by the appended claims. The disclosed embodiments are illustrative and should not be construed as limiting.

What is claimed is:
1. A mobile device comprising:
a display; and
a control device configured to control the display to display a user interface on the display, wherein the user interface comprises:
   a user menu region configured to allow a user to input a search condition of a point of interest (POI);
   a detailed information region configured to display information on one or more candidate POIs that satisfy the search condition; and
   a heat map display region configured to display a distribution of the one or more candidate POIs that satisfy the search condition as a heat map, wherein the heat map is a background for the user menu region and the detailed information region,
wherein the user menu region, the detailed information region and the heat map display region are separately displayed on a single screen;
wherein the POI represents a store;
wherein a business status of the POI, a price of a product sold in the store, and an area average price of the product are displayed on the single screen; and
wherein the area average price of the product is displayed adjacent to the price of the product sold in the store.

2. The mobile device according to claim 1, wherein the detailed information region is configured to display price information of the product sold in the store.

3. The mobile device according to claim 2, wherein the price information comprises a national average price.

4. The mobile device according to claim 3, wherein the detailed information region further comprises an additional user menu configured to allow the user to select a unique search condition of a category to which the POI belongs.

5. The mobile device according to claim 4, wherein the additional user menu comprises a plurality of search conditions configured in a drop-down manner.

6. The mobile device according to claim 1, wherein the detailed information region further comprises an additional user menu configured to allow the user to select a unique search condition of a category to which the POI belongs.

7. The mobile device according to claim 6, wherein the additional user menu comprises a plurality of search conditions configured in a drop-down manner.

8. A mobile device comprising:
a display; and
a control device configured to control the display to display a user interface on the display, wherein the user interface comprises a point of interest (POI) tag configured to display information about a POI in a region surrounding a current location of the mobile device, wherein:
   the POI tag is configured to indicate a business status of the POI using a graphical representation;
   a category of the POI and a brand of the POI are selectively displayed on the POI tag depending on a distance between the mobile device and the POI;
   the POI represents a store;
   the business status of the POI, a price of a product sold in the store, and an area average price of the product are displayed on a single screen; and
   the area average price of the product is displayed adjacent to the price of the product sold in the store.

9. The mobile device according to claim 8, wherein the business status of the POI includes whether the POI is currently open or closed.

10. The mobile device according to claim 8, wherein the business status of the POI includes remaining opening hours of the POI.

11. The mobile device according to claim 8, wherein the business status of the POI includes whether the POI is currently in a break time.

12. The mobile device according to claim 8, wherein the business status of the POI includes whether the POI is closed for a remainder of a current day.

13. The mobile device according to claim 8, wherein the graphical representation comprises a ring shape, and wherein the business status of the POI is configured to be indicated using shading of the ring shape.

14. The mobile device according to claim 8, wherein the graphical representation comprises a bar shape, and wherein the business status of the POI is configured to be indicated using shading of the bar shape.

15. The mobile device according to claim 8, wherein the graphical representation comprises a ring shape or a bar shape, and wherein the POI tag is configured to indicate the business status of the POI using shading, length, or color of the ring shape or the bar shape.

16. A mobile device comprising:
- a camera configured to capture an image of an area in front of the camera, wherein a point of interest (POI) is in the area;
- a display configured to display the image captured by the camera; and
- a controller configured to control the display to display an augmented reality-based POI tag on the image captured by the camera, wherein the POI tag includes information related to the POI, wherein the POI tag is configured to indicate a business status of the POI using a graphical representation;

wherein:
- a category of the POI and a brand of the POI are selectively displayed on the POI tag depending on a distance between the mobile device and the POI;
- the POI represents a store;
- the business status of the POI, a price of a product sold in the store, and an area average price of the product are displayed on a single screen; and
- the area average price of the product is displayed adjacent to the price of the product sold in the store.

17. The mobile device according to claim 16, wherein the business status of the POI includes whether the POI is currently open or closed, whether the POI is temporarily closed for a break or closed for a remainder of a current day, or how many hours the POI will remain open on the current day.

18. The mobile device according to claim 16, wherein the graphical representation comprises a ring shape, and wherein the business status of the POI is configured to be indicated using shading or coloring of the ring shape.

19. The mobile device according to claim 16, wherein the graphical representation comprises a bar shape, and wherein the business status of the POI is configured to be indicated using shading or coloring of the bar shape.

20. The mobile device according to claim 16, wherein the information related to the POI comprises a distance and a direction from a current location of the mobile device to the POI, a category type of the POI, a logo of the POI, a name and a price of a product provided by the POI, or a price comparison result between the POI and another business of a same category type.

* * * * *